United States Patent
Cho et al.

(10) Patent No.: US 10,756,333 B2
(45) Date of Patent: Aug. 25, 2020

(54) CATHODE ACTIVE MATERIAL COMPRISING POLYIMIDE, MANUFACTURING METHOD THEREOF, AND LITHIUM-SULFUR BATTERY COMPRISING SAME

(71) Applicant: LG CHEM, LTD., Seoul (KR)

(72) Inventors: Eunkyung Cho, Daejeon (KR); Taek Gyoung Kim, Daejeon (KR); Doo Kyung Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 133 days.

(21) Appl. No.: 16/080,610

(22) PCT Filed: Jul. 28, 2017

(86) PCT No.: PCT/KR2017/008135
§ 371 (c)(1),
(2) Date: Aug. 28, 2018

(87) PCT Pub. No.: WO2018/030686
PCT Pub. Date: Feb. 15, 2018

(65) Prior Publication Data
US 2019/0067682 A1   Feb. 28, 2019

(30) Foreign Application Priority Data
Aug. 10, 2016   (KR) .................. 10-2016-0101999

(51) Int. Cl.
*H01M 4/00* (2006.01)
*H01M 4/1393* (2010.01)
(Continued)

(52) U.S. Cl.
CPC ............ *H01M 4/1393* (2013.01); *C08K 3/06* (2013.01); *H01M 4/133* (2013.01); *H01M 4/136* (2013.01);
(Continued)

(58) Field of Classification Search
CPC ............ H01M 10/0569; H01M 4/364; H01M 10/052; H01M 4/621; Y02E 60/122; Y02T 10/7011
See application file for complete search history.

(56) References Cited

U.S. PATENT DOCUMENTS

2004/0009393 A1   1/2004   Kim et al.
2007/0202403 A1   8/2007   Oh et al.
(Continued)

FOREIGN PATENT DOCUMENTS

CN   103490027 A   1/2014
CN   106159205 A   11/2016
(Continued)

OTHER PUBLICATIONS

Min et al., "Colorless and Transparent Polyimide Films from Poly(amic acid)s with Cross-linkable Anhydride End," Polymer(Korea), vol. 34, No. 6, 2010, pp. 495-500, with English abstract.
(Continued)

*Primary Examiner* — Cynthia H Kelly
*Assistant Examiner* — Monique M Wills
(74) *Attorney, Agent, or Firm* — Birch, Stewart, Kolasch & Birch, LLP

(57) ABSTRACT

The present invention relates to a positive electrode active material for a lithium-sulfur battery containing polyimide, more specifically, a positive electrode active material formed by complexing the composite of polyimide and carbon-based secondary particles with sulfur particles, a preparation method thereof and a lithium-sulfur battery comprising the same. If the positive electrode active material formed by including and complexing the polyimide according to the present invention is applied to the lithium-sulfur battery, the elution of the polysulfide is suppressed, and thus lifetime characteristics and energy efficiency are improved.

14 Claims, 1 Drawing Sheet

(51) Int. Cl.

| | | |
|---|---|---|
| *H01M 4/38* | (2006.01) | |
| *H01M 4/1399* | (2010.01) | |
| *H01M 4/136* | (2010.01) | |
| *H01M 4/60* | (2006.01) | |
| *H01M 4/62* | (2006.01) | |
| *H01M 4/133* | (2010.01) | |
| *H01M 4/137* | (2010.01) | |
| *C08K 3/06* | (2006.01) | |
| *H01M 4/58* | (2010.01) | |
| *H01M 4/36* | (2006.01) | |
| *H01M 4/583* | (2010.01) | |
| *H01M 10/0569* | (2010.01) | |
| *H01M 10/052* | (2010.01) | |
| *H01M 4/02* | (2006.01) | |

(52) U.S. Cl.
CPC ......... *H01M 4/137* (2013.01); *H01M 4/1399* (2013.01); *H01M 4/364* (2013.01); *H01M 4/38* (2013.01); *H01M 4/583* (2013.01); *H01M 4/5815* (2013.01); *H01M 4/602* (2013.01); *H01M 4/608* (2013.01); *H01M 4/621* (2013.01); *H01M 4/625* (2013.01); *H01M 10/0569* (2013.01); *H01M 10/052* (2013.01); *H01M 2004/027* (2013.01); *H01M 2004/028* (2013.01); *Y02E 60/122* (2013.01); *Y02T 10/7011* (2013.01)

(56) References Cited

U.S. PATENT DOCUMENTS

| | | | |
|---|---|---|---|
| 2012/0052397 A1 | 3/2012 | Mikhaylik et al. | |
| 2013/0029222 A1 | 1/2013 | Niwa et al. | |
| 2013/0183549 A1 | 7/2013 | Kourtakis | |
| 2013/0224585 A1 | 8/2013 | Oh et al. | |
| 2013/0273435 A1 | 10/2013 | Leitner et al. | |
| 2013/0330619 A1* | 12/2013 | Archer .................. | H01M 4/136 429/213 |
| 2014/0322614 A1 | 10/2014 | Eitouni et al. | |
| 2015/0221935 A1 | 8/2015 | Zhou et al. | |
| 2015/0340696 A1 | 11/2015 | Son et al. | |
| 2016/0164103 A1 | 6/2016 | Son et al. | |
| 2016/0233475 A1 | 8/2016 | Son et al. | |
| 2017/0040647 A1 | 2/2017 | Jang et al. | |
| 2017/0170481 A1 | 6/2017 | Jang et al. | |

FOREIGN PATENT DOCUMENTS

| | | |
|---|---|---|
| JP | 2004-342575 A | 12/2004 |
| JP | 2013-229227 A | 11/2013 |
| JP | 2015-507837 A | 3/2015 |
| JP | 2017-103212 A | 6/2017 |
| KR | 10-2004-0009328 A | 1/2004 |
| KR | 1487620 A | 4/2004 |
| KR | 10-2007-0027438 A | 3/2007 |
| KR | 10-2011-0126418 A | 11/2011 |
| KR | 10-2013-0031079 A | 3/2013 |
| KR | 10-2014-0073936 A | 6/2014 |
| KR | 10-2014-0139135 A | 12/2014 |
| KR | 10-1477782 B1 | 12/2014 |
| KR | 10-2015-0142832 A | 12/2015 |
| KR | 10-1584881 B1 | 1/2016 |
| KR | 10-2016-0024776 A | 3/2016 |
| KR | 10-2016-0046775 A | 4/2016 |
| KR | 10-1637983 B1 | 7/2016 |
| KR | 10-2014-0090109 A | 7/2017 |
| WO | WO2011/129103 A1 | 10/2011 |
| WO | WO 2011/145871 A2 | 11/2011 |
| WO | WO 2015/056907 A1 | 4/2015 |
| WO | WO 2015/085157 A1 | 6/2015 |
| WO | WO 2015/141952 A1 | 9/2015 |
| WO | WO 2016/032223 A1 | 3/2016 |

OTHER PUBLICATIONS

Gu et al., "Improving the Performance of Lithium-Sulfur Batteries by Employing Polyimide Particles as Hosting Matrixes", ACS Applied Materials and Interfaces, vol. 8, Feb. 29, 2016, pp. 7464-7470.
Li et al., "A Highly Ordered Meso@Microporous Carbon-Supported Sulfur@Smaller Sulfur Core-Shell Structured Cathode for Li—S Batteries", ACS Nano, vol. 8, No. 9, 2014, (published online Aug. 21, 2014), pp. 9295-9303.
Xin et al., "Encapsulation of Sulfur in a Hollow Porous Carbon Substrate for Superior Li—S Batteries With Long Lifespan", Part. Part. Syst. Charact., vol. 30, 2013, pp. 321-325.
International Search Report (PCT/ISA/210) issued in PCT/KR2017/008135, dated Nov. 24, 2017.
Manthiram et al., "Lithium-Sulfur Batteries: Progress and Prospects", Advanced Materials, vol. 27, Issue 12, Mar. 25, 2015, pp. 1980-2006.
Park et al., "Polyimide gel polymer electrolyte-nanoencapsulated LiCoO2 cathode materials for high-voltage Li-ion batteries", Electrochemistry Communications, vol. 12, No. 8, Jun. 2, 2010, pp. 1099-1102.

\* cited by examiner

[Figure 1]
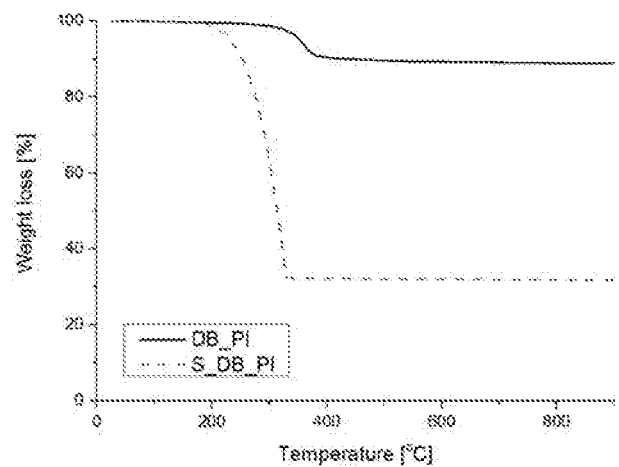
[Figure 2]
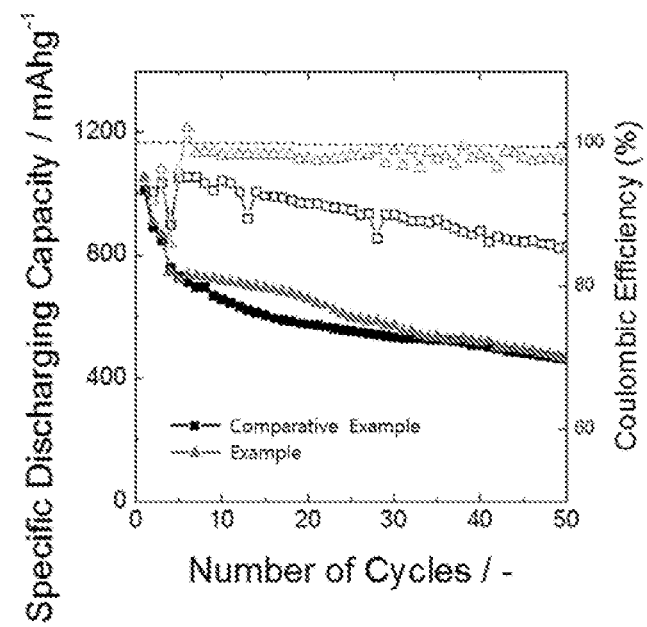

CATHODE ACTIVE MATERIAL COMPRISING POLYIMIDE, MANUFACTURING METHOD THEREOF, AND LITHIUM-SULFUR BATTERY COMPRISING SAME

TECHNICAL FIELD

The present application claims the benefit of Korean Patent Application No. 10-2016-0101999 filed on Aug. 10, 2016, all the contents of which is incorporated herein by reference.

The present invention relates to a positive electrode active material containing polyimide for a lithium-sulfur battery, more specifically, a positive electrode active material formed by complexing the composite of polyimide and carbon-based secondary particles with sulfur particles, a preparation method thereof and a lithium-sulfur battery comprising the same.

BACKGROUND ART

Recently, as the miniaturization and weight reduction of electronic products, electronic devices, communication devices, and the like are rapidly progressing and the need for electric vehicles has been greatly increased in relation to environmental problems, there is also a growing demand for performance improvements in secondary batteries used as power sources for these products. Among them, the lithium secondary battery has been attracting considerable attention as a high-performance battery because of its high energy density and high standard electrode potential.

The lithium-sulfur (Li—S) battery is a secondary battery using a sulfur-based material having an S—S bond (sulfur-sulfur bond) as a positive electrode active material and using lithium metal as a negative electrode active material. The Lithium-sulfur battery has advantages in that sulfur, which is the main material of the positive electrode active material, is very rich in resources, is not toxic, and has a low atomic weight. In addition, theoretical discharge capacity of the lithium-sulfur battery is 1675 mAh/g-sulfur, and its theoretical energy density is 2,600 Wh/kg. Since the energy density of the lithium-sulfur battery is much higher than the theoretical energy density of other battery systems currently under study (Ni-MH battery: 450 Wh/kg, Li—FeS battery: 480 Wh/kg, Li—MnO$_2$ battery: 1,000 Wh/kg, Na—S battery: 800 Wh/kg), the lithium-sulfur battery is the most promising battery among the batteries developed so far.

During the discharging of the lithium-sulfur battery, an oxidation reaction of lithium occurs at the negative electrode (Anode) and a reduction reaction of sulfur occurs at the positive electrode (Cathode). Sulfur before discharging has an annular S$_8$ structure. During the reduction reaction (discharging), as the S—S bond is cut off, the oxidation number of S decreases, and during the oxidation reaction (charging), as the S—S bond is re-formed, electrical energy is stored and generated using an oxidation-reaction reaction in which the oxidation number of S increases. During this reaction, the sulfur is converted from the cyclic S$_8$ structure to the linear structure of lithium polysulfide (Li$_2$S$_x$, x=8, 6, 4, 2) by the reduction reaction and eventually, when the lithium polysulfide is completely reduced, lithium sulfide (Li$_2$S) is finally produced. By the process of reducing to each lithium polysulfide, the discharging behavior of the lithium-sulfur battery is characterized by a step-wise discharge voltage unlike lithium ion battery.

Among lithium polysulfides such as Li$_2$S$_8$, Li$_2$S$_6$, Li$_2$S$_4$ and Li$_2$S$_2$, particularly, lithium polysulfide (Li$_2$S$_x$, usually x>4), which has a high oxidation number of sulfur, is easily dissolved in a hydrophilic electrolyte solution. The lithium polysulfide dissolved in the electrolyte solution diffuses away from the positive electrode where the lithium polysulfide is generated by the concentration difference. Thus, the lithium polysulfide eluted from the positive electrode is lost to the outside of the positive electrode reaction zone, making it impossible to perform the stepwise reduction to lithium sulfide (Li$_2$S). That is, since the dissolved lithium polysulfide which is present in the dissolved state away from the positive electrode and the negative electrode cannot participate in the charging and discharging reactions of the battery, the amount of sulfur involved in the electrochemical reaction is reduced at the positive electrode and as a result, it is a major factor in reducing the charging capacity and energy of the lithium-sulfur battery.

Furthermore, in addition to being floated or deposited in the electrolyte solution, the lithium polysulfide diffused into the negative electrode reacts directly with lithium and sticks to the surface of the negative electrode in the form of Li$_2$S, thus causing the corrosion of the lithium metal negative electrode.

In order to minimize the elution of lithium polysulfide, a large number of studies are underway. For example, the studies which use carbon containing nitrogen or oxygen, known as adsorbents of lithium polysulfide or similarly which induce the adsorption of lithium polysulfide by coating or adding polymer to electrode or composite have been carried out, but it is not enough to completely solve the dissolution problem of lithium polysulfide.

PRIOR ART LITERATURE

Patent Literature

Korean Patent Registration No. 10-1637983, Surface-coated positive electrode active material, preparation method thereof and lithium secondary battery comprising the same.

Non-Patent Literature

A. Manthiram et al., Adv. Mat. 2015, 27, 1980.

DISCLOSURE

Technical Problem

As described above, the lithium-sulfur battery has a problem that as the charging and discharging cycles are proceeding, the battery capacity and life characteristics are degraded due to the lithium polysulfide eluted and diffused from the positive electrode.

Accordingly, it is an object the present invention to provide a positive electrode active material for a lithium-sulfur battery, which inhibits the elution of lithium polysulfide, and a preparation method thereof.

In addition, another object of the present invention is to provide the lithium-sulfur battery including the positive electrode active material.

Technical Solution

In order to achieve the above objects, the present invention provides a polyimide-carbon-sulfur composite (hereinafter referred to as PI/C/S composite) comprising porous carbon-based secondary particles formed by assembling and aggregating a plurality of carbon-based primary particles; a coating layer of polyimide coated on the inside and outside of the pores of the carbon-based secondary particles; and sulfur (S) carried on the pores of the carbon-based secondary particles.

In addition, the present invention provides a preparation method of the polyimide-carbon-sulfur composite, characterized by comprising 1) preparing secondary particles using a carbon-based material (C); 2) mixing the carbon-based secondary particles and the solution of the polyimide precursor; 3) preparing a polyimide-carbon composite by imidizing the polyimide precursor; and 4) preparing the polyimide-carbon-sulfur composite by causing sulfur to be supported on the polyimide-carbon composite.

In addition, the present invention provides a positive electrode for the lithium-sulfur battery, which includes the positive electrode active material, a conducting material, and a binder resin.

In addition, the present invention provides a lithium-sulfur battery including the above positive electrode.

Advantageous Effects

If the lithium-sulfur battery including the PI/C/S composite according to the present invention formed by complexing the PI/C composite of the polyimide and the carbon-based material and sulfur particles is applied to the lithium-sulfur battery, the elution of the polysulfide is suppressed, and thus lifetime characteristics and energy efficiency are improved.

DESCRIPTION OF DRAWINGS

FIG. 1 shows data of thermogravimetric analysis (TGA) of the PI/C composite according to Example 1 of the present invention.

FIG. 2 shows data exhibiting life characteristics and energy efficiencies of the lithium-sulfur battery according to Example 1 and Comparative Example 1 of the present invention.

BEST MODE

Hereinafter, the present invention will be described in detail.

The present invention provides a polyimide-carbon-sulfur composite (hereinafter referred to as PI/C/S composite) comprising porous carbon-based secondary particles formed by assembling and aggregating a plurality of carbon-based primary particles; a coating layer of polyimide (PI) coated on the inside and outside of the pores of the carbon-based secondary particles; and sulfur (S) supported on the pores of the carbon-based secondary particles.

The polyimide is a polymer containing a large amount of nitrogen atoms (N) and oxygen atoms (O) in the molecular structure wherein the nitrogen and oxygen atoms effectively adsorb (or fix) polysulfide ions ($S_x^{2-}$) present in the electrode active material by effectively attracting polysulfide ions due to high electronegativity, thereby inhibiting the elution of the polysulfide into the electrolyte. However, as in the conventional US patent (2014-0322614), this effect cannot be predicted in the form of a simple mixture of the conducting material and the polyimide.

The polyimide in the PI/C/S composite can be present in various forms, and for example, the polyimide forms a continuous simple coating layer or discontinuous coating layer (ex., island form or partial coating) on the surface of the carbon-based secondary particles or the polyimide allows the pores to be maintained and forms a porous coating layer. This form is not limited in the present invention as long as it enhances the adsorption of polysulfide ions and does not degrade the function of high electrical conductivity which is a function of the carbon-based material itself.

For example, when the polyimide forms the continuous simple coating layer, adsorption of polysulfide ions is possible in a large area, thereby effectively suppressing the elution of polysulfide. On the other hand, when the polyimide forms the discontinuous coating layer, the adsorption of polysulfide ions becomes possible while maintaining the electron conductivity of the carbon-based material as it is. In addition, in the case of the porous coating layer, the polysulfide can be more effectively fixed in the pores of the porous coating layer together with the maintenance of the electron conductivity of the carbon-based material, thereby ensuring the effect of improving the battery performance.

This type of control can be achieved through the control of the concentration of the solution of the polyimide precursor used in the preparation of the polyimide at the time of preparation, and in the case of low concentration, a discontinuous coating layer is formed, and as the concentration is increased, a continuous coating layer is formed.

The carbon-based secondary particles are formed by aggregation of the carbon-based primary particles. The carbon-based primary particles can be in the form of powders, and when the primary particles in the form of powders are agglomerated, void can be formed between primary particles. Accordingly, the carbon-based secondary particles formed by aggregation of the carbon-based primary particles have the form of the porous particles.

The carbon-based materials constituting the carbon-based secondary particles are not limited in their kind, and for example include one selected from the group consisting of graphite series such as natural graphite, artificial graphite, expanded graphite, graphene, graphene oxide, Super-P, Super-C; active carbon series; carbon black series such as Denka black, Ketjen black, channel black, furnace black, thermal black, contact black, lamp black and acetylene black; carbon nanostructures such as carbon fiber series, carbon nanotube (CNT), and fullerene; and combinations thereof. Preferably, carbon black series are used.

Considering the slurry mixing and the smoothness of the electrode surface, it is preferable that the carbon-based secondary particles have an average particle diameter of 1 to 50 μm. When the average particle diameter exceeds the above range, the porosity between the secondary particles increases, the tap density decreases, slurry mixing and sedimentation phenomenon occur slowly, and thus it is not preferable. On the contrary, when it is less than the above range, efficiency in the process cannot be exerted. Accordingly, the average particle diameter is adjusted within the above range.

In addition, the carbon-based secondary particles have voids therein due to textural pores generated during aggregation of the primary particles in addition to the pores of primary particles, and these voids can be measured by BET analysis. The pore volume thus measured may range from about 0.2 to 4.0 cm$^3$/g and the specific surface area may be from 100 to 2000 m$^2$/g.

The weight ratio of the polyimide to the carbon-based secondary particles is preferably in the range of 5:95 to 20:80. When the polyimide is contained in an amount less than the above range, it is difficult to ensure the effect of inhibiting elution of lithium polysulfide due to the polyimide, which is an object of the present invention. When the polyimide is contained in an amount exceeding the above range, it is difficult to ensure sufficient electrical conductivity because the weight of the carbon-based material is relatively reduced.

Sulfur in the polyimide-carbon-based material-sulfur composite can be selected from at least one sulfur compound selected from the group consisting of elemental sulfur ($S_8$), catholytes in which solid $Li_2S_n$ (n≥1) is dissolved, organosulfur compounds, and carbon-sulfur polymers [$(C_2S_x)_n$, where x=2.5 to 50, and n≥2].

At this time, the content of sulfur in the PI/C/S composite can be adjusted to be between 30 and 90% by weight based on the total weight of the composite. The range is a content range which can sufficiently perform the function as an electrode active material, but can ensure electron conductivity by the carbon-based material (C). If the content of sulfur is less than the above range, it cannot function as an active material, and on the contrary, if sulfur is used in excess of the above range, the sulfur which is not bonded with the carbon becomes aggregated with each other while the sulfur is molten, and thus sulfur is difficult to accept electrons and thus directly participate in the electrode reaction, thereby resulting in deterioration of the performance of the battery.

The positive electrode (i.e., sulfur electrode) of the lithium-sulfur battery including the PI/C/S composite can reduce the loss of active material by adsorbing polysulfide ions dissolved from the electrode to the PI and thus inhibiting the diffusion of the polysulfide, and also can improve the charging/discharging efficiency and the cycle performance as the polysulfide ions near the electrode participate in the discharging reaction. In addition, since there is a kinetic synergistic effect due to the solid-liquid reaction, it is possible to ensure a high reaction activity in contrast to the solid surface.

Preparation Method

The positive electrode active material for the lithium-sulfur battery according to the present invention is prepared by performing two-step complexing of I) a PI/C composite preparation step which synthesizes polyimide on carbon-based material; and II) a PI/C/S composite preparation step which complexes the PI/C composite with sulfur particles.

First, the PI/C composite preparation step of step I) comprises specifically,
1) preparing secondary particles using the carbon-based material;
2) mixing the carbon-based secondary particles and the solution of the polyimide precursor; and
3) imidizing the polyimide precursor.

Hereinafter, each step will be described in detail.

First, 1) secondary particles are prepared from the carbon-based material. The most preferred method for preparing the secondary particles using the carbon-based material is spray drying. First, a carbon-based material is selected, mixed with a predetermined solvent to prepare a spray liquid, and the spray liquid is sprayed as nano-sized fine droplets to form a secondary particle form.

As the spray drying equipment, the spray drying equipments commonly used may be used. For example, the ultrasonic spray dryer, the air nozzle spray dryer, the ultrasonic nozzle spray dryer, the filter expansion aerosol generator, or the electrostatic spray dryer, etc. may be used, but is not limited thereto.

The solvent for diluting the carbon-based powder may be any one of water, methanol, ethanol, isopropyl alcohol, and acetone, but is not limited thereto, and any solvent is possible as long as it can evenly disperse the carbon-based powder. In addition to this, a predetermined dispersing agent can be further added for strengthening the bonding force between primary particles and dispersing primary particles.

According to an embodiment of the present invention, the solid content contained in the spray liquid is 0.5 to 40% by weight, and more preferably 15 to 30% by weight. The content can be adjusted appropriately according to the carbon material of the primary particles.

When spray drying is carried out, the drying temperature may vary depending on the solvent used and may be a temperature above the boiling point of the solvent, for example, 100 to 220° C. in the case of water, and the spraying pressure may be, but is not limited to, 1.5 to 3 bar. In addition, the rate of supplying the spray liquid can be adjusted up to 10 ml/min, and the rate can be varied depending on the magnitude of the pressure to be depressurized.

Thereafter, the secondary particles are prepared, and then carbonization process at 400 to 900° C. for 2 to 10 hours can be further performed to remove the dispersant used for strengthening the bonding force between the primary particles and dispersing primary particles.

2) The carbon-based secondary particles thus prepared and the solution of the polyimide precursor are mixed. At this time, the polyimide precursor may be polyamic acid (PAA), polyamic ester, polyamic acid ester or other reaction product depending on the choice of starting material, and polyamic acid is preferably applied.

For example, polyamic acid can be prepared by polymerization of an aromatic anhydride and an aromatic diamine, and preferably by solution polymerization of an aromatic anhydride and an aromatic diamine, followed by ring closure dehydration at a high temperature and imidization.

As the aromatic anhydride component, Biphenyl dianhydride (3,3',4,4'-biphenyltetracarboxylic dianhydride, BPDA), pyromellitic dianhydride (1,2,4,5-benzenetetracarboxylic dianhydride, PMDA) and the like can be used.

In addition, as the aromatic diamine component, oxydianiline (ODA), para-phenylene diamine (pPDA), meta-phenylene diamine (mPDA), methylenedianiline (MDA), bis-aminophenyl hexafluoropropane (HFDA) and the like can be used.

When the polyamic acid is polymerized, the aromatic anhydride component and the aromatic diamine component in the organic solvent may be used in a molar ratio of 1:0.99 to 0.99:1 to be approximately the same molar amount. Within the range of the molar ratio of the monomers to meet the objects described above, it is also possible to use one aromatic anhydride and one aromatic diamine, two or more aromatic anhydrides and one or more aromatic diamines, or two or more aromatic diamines and one or more aromatic anhydrides.

The organic solvent for the polymerization reaction of the polyamic acid solution is not particularly limited as long as it is a solvent dissolving the polyamic acid. As known reaction solvents, at least one polar solvent selected from m-cresol, N-methyl-2-pyrrolidone (NMP), dimethylformamide (DMF), dimethylacetamide (DMAc), dimethylsulfoxide (DMSO), acetone and diethyl acetate is used. In addition, a low-boiling solvent such as tetrahydrofuran (THF) or chloroform or a low-absorptive solvent such as γ-butyrolactone may be used.

The reaction conditions are not particularly limited, but the reaction temperature is preferably −20 to 80° C., and the reaction time is preferably 2 to 48 hours. Further, during the reaction, an inert: atmosphere soon as argon (Ar) or nitrogen (N$_2$) is more preferable.

The polyamic acid can be prepared, for example, from a coating solution comprising pyromellitic dianhydride (PMDA), an aromatic anhydride, and 4,4'-oxydianiline (ODA), an aromatic diamine in dimethyl acetamide (DMAc) as a solvent, in a nitrogen atmosphere. At this time, the mole fraction of PMDA/ODA in the coating solution can be from 1/1 to 1/1.05, and the polyamic acid is preferably contained in an amount of 0.1 to 5 wt. %, more preferably 0.5 to 2 wt. %.

In order to prepare the dispersion by mixing and stirring carbon-based secondary particles in a solution of the polyimide precursor, the secondary particles of the carbon-based material, for example, denka black, are immersed in the prepared solution of polyamic acid, and then the mixture can be stirred for 10 to 100 minutes using a mixer capable of being driven at the room temperature (about 15 to 30° C.) at a rotation speed of 10,000 rpm or more. The temperature range and the rotation speed range may be conditions in which the Denka black can be smoothly dispersed in the organic solvent in which the polyamic acid is diluted. If the temperature is excessively high, there is concern that polyimidation reaction in which polyamic acid is converted to polyimide may proceed prematurely.

Next, the dispersion is filtered and dried to prepare a composite of the polyimide precursor and the carbon-based material. Denka black is filtered out from the dispersion and dried at 75 to 95° C. for about 5 to 10 hours to prepare a composite of the coated polyamic acid and Denka black.

Then, 3) the polyimide precursor is converted to polyimide by imidization. As the imidization method for converting the polyimide precursor into polyimide, the thermal imidization method, the chemical imidization method, or a combination of the thermal imidization method and the chemical imidization method may be applied. The chemical imidization method is a method in which the dehydrating agent represented by the acid anhydride such as acetic anhydride and the imidization catalyst represented by the tertiary amine such as isoquinoline, β-picoline or pyridine are added to the polyamic acid solution. When the thermal imidization method or the combination of the thermal imidization method and the chemical imidization method is applied, the heating condition of the polyamic acid solution may vary depending on the type of the polyamic acid solution, the thickness of the polyimide to be produced, and the like.

For example, thermal imidization method can be performed. At this time, it is preferable to perform a stepwise heat treatment in order to obtain a uniform and continuous coating on the surface of the secondary particles of Denka black. That is, Denka black coated with polyamic acid can be heat-treated by successively raising the temperature from 60° C. to 400° C.

II) The PI/C composite prepared above can be complexed with sulfur according to the conventional method. For example, the liquid impregnation method in which sulfur is impregnated by repeating several times the process of dissolving sulfur in an organic solvent to fill the pore volume of the PI/C composite and drying the solvent, and the melt-diffusion method in which sulfur is dissolved by heating at the melting point (about 115° C.) or above and then impregnated by the capillary phenomenon of the pore volume may be applied.

For example, first, the sulfur powder is prepared and then mixed with the PI/C composite prepared above to make the particle size uniform using the wet ball mill or dry jet mill method. At this time, a step of adjusting the particle size before mixing and then dispersing using the organic solvent can be further included. At this time, since the size-controlled sulfur particles can be partly aggregated, if the particles are swelled in the organic solvent, the aggregated particles can be dissociated by the repulsive force between the particles. The organic solvent which can be used can be selected from the group consisting of ethanol, toluene, benzene, N-methyl-2-pyrrolidone (NMP), dimethylsulfoxide (DMSO), acetone, chloroform, dimethylformamide, cyclohexane, tetrahydrofuran and methylene chloride. The mixing method may be carried out by putting the mixture in a powder mixer for a predetermined time. If the pressure is applied to the mixed powder prepared through the predetermined drying process, the void between the sulfur particles and the PI/C composite can be reduced. If the void between the sulfur particles and the PI/C composite is reduced by the above-described pressing process, the sulfur particles can be melted through the melting process and the binding force with the PI/C composite can be increased.

Positive Electrode

When the PI/C/S composite as described above is used as the positive electrode composition, the PI/C/S composite may be used alone, or used in combination with a conducting material, a binder, a filler, and the like in addition to the PI/C/S composite, if necessary.

For example, the positive electrode composition for the lithium-sulfur battery according to the present invention may further include the conducting material for imparting electronic conductivity in addition to the PI/C/S composite, which is a positive electrode active material. The conducting material electrically connects the electrolyte and the positive electrode active material, and acts as a path through which lithium ions (Li$^+$) dissolved in the electrolyte migrate to the sulfur and react therewith. In addition, the conducting material also acts, at the same time, as a path through which electrons move from the current collector to the sulfur.

Therefore, if the amount of the conducting material is insufficient or the conducting material does not perform properly, the non-reacting portion of the sulfur in the electrode is increased and eventually the reduction of capacity is caused. Also, the high rate discharge characteristics and the charging and discharging cycle life are adversely affected. Therefore, it is necessary to add an appropriate amount of conducting material. The conducting material is preferably added in an amount of 0.01 to 30% by weight based on the total weight of the positive electrode composition.

The conducting material is not particularly limited as long as it has electrical conductivity without causing chemical change in the battery, and for example, graphite; carbon blacks such as Denka black, acetylene black, Ketjen black, channel black, furnace black, lamp black, and summer black; conductive fibers such as carbon fibers and metal fibers; metal powders such as carbon fluoride, aluminum, and nickel powder; conductive whiskers such as zinc oxide and potassium titanate; conductive metal oxides such as titanium oxide; conductive materials such as polyphenylene derivatives and the like can be used. Specific examples of commercially available conducting materials may include acetylene black series of products from Chevron Chemical Company or Denka black (Denka Singapore Private Limited), products form Gulf Oil Company, Ketjen black, EC series of products from Armak Company, products of Vulcan XC-72 from Cabot Company and Super P (products of Timcal).

The binder is a component which assists in the binding of the active material and the conducting material and the bonding to a current collector, and typically added in an amount of 1 to 50 wt. % based on the total weight of the mixture comprising the electrode active material. When the content of the binder resin is less than 1 wt. %, the physical properties of the positive electrode deteriorate and the positive electrode active material and the conducting material may be detached. When the content of the binder resin exceeds 50% by weight, the ratio of the active material and the conducting material in the positive electrode may be relatively decreased, thereby reducing the battery capacity.

The binder applicable to the present invention may be any binder known in the art, and specifically may be, but is not limited thereto, any one selected from the group consisting of fluororesin-based binders including polyvinylidene fluoride (PVdF) or polytetrafluoroethylene (PTFE); rubber-based binders including styrene-butadiene rubber, acrylonitrile-butadiene rubber, and styrene-isoprene rubber; cellulose-based binders including carboxymethylcellulose (CMC), starch, hydroxypropylcellulose, and regenerated cellulose; polyalcohol-based binders; polyolefin-based binders including polyethylene and polypropylene; polyimide-based binders, polyester-based binders, silane-based binders and mixtures or copolymers of two or more thereof.

The filler is not specifically limited as long as it is a fibrous material without causing chemical change in the battery, and for example, includes olefin-based polymers such as polyethylene and polypropylene; and fibrous materials such as glass fiber and carbon fiber.

The positive electrode as described above may be prepared by the conventional method, and specifically, prepared by coating the positive electrode composition, which was prepared by mixing the positive electrode active material, the conducting material and the binder in the organic solvent, onto the current collector, drying it, and optionally compression molding onto the current collector to improve the electrode density. Here, as the organic solvent, it is preferable to use a solvent which can uniformly disperse the positive electrode active material, the binder and the conducting material, and is easily evaporated. Specifically, the solvent may include acetonitrile, methanol, ethanol, tetrahydrofuran, water, isopropyl alcohol, and the like.

The current collector generally has a thickness of 3 to 500 µm and is not particularly limited as long as it has high conductivity without causing chemical change in the battery. Specifically, conductive materials such as stainless steel, aluminum, copper, or titanium may be used, and more specifically, a carbon-coated aluminum current collector may be used. The use of the carbon-coated aluminum substrate is advantageous in that it has excellent adhesion to active material, has low contact resistance, and prevents corrosion by aluminum polysulfide, when compared with those which have no carbon-coating. The current collector may have various forms such as film, sheet, foil, net, porous substance, foam or nonwoven fabric.

Lithium-Sulfur Battery

The lithium-sulfur battery according to the present invention comprises a positive electrode including the PI/C/S composite of the present invention; a negative electrode comprising lithium metal or lithium alloy; a separator interposed between the positive electrode and the negative electrode; and an electrolyte.

In particular, the positive electrode including PI/C/S compost improves electrode loading and initial discharge capacity and eventually increases the energy density of the lithium-sulfur battery by inhibiting the elution of lithium polysulfide. As a result, the lithium-sulfur battery can be suitably applied as a high-density battery or a high-performance battery.

The negative electrode active material for the lithium-sulfur battery according to the present invention may be one selected from the group consisting of lithium metal, lithium alloy, lithium metal composite oxide, lithium-containing titanium composite oxide (LTO), and combinations thereof. At this time, the lithium alloy may be an alloy of lithium and at least one metal selected from Na, K, Rb, Cs, Fr, Be, Mg, Ca, Sr, Ba, Ra, Al and Sn. In addition, the lithium metal composite oxide is an oxide (MeOx) of lithium and any one metal (Me) selected from the group consisting of Si, Sn, Zn, Mg, Cd, Ce, Ni and Fe, and for example, the lithium metal composite oxide may be $Li_xFe_2O_3$ ($0<x\le1$) or $Li_xWO_2$ ($0<x\le1$).

The separator of the lithium-sulfur battery according to the present invention is a physical separator having a function of physically separating electrodes. Any separator can be used without any particular limitations as long as it is used as a conventional separator. Particularly, a separator with excellent humidification ability of the electrolyte solution while exhibiting low resistance to ion migration of electrolyte solution is preferable.

In addition, the separator enables the lithium ion to be transported between the positive electrode and the negative electrode while separating or insulating the positive electrode and the negative electrode from each other. Such separator may be made of a porous, nonconductive or insulating material. The separator may be an independent member such as a film, or a coating layer added to the positive electrode and/or the negative electrode.

Specifically, a porous polymer film, for example, a porous polymer film made of a polyolefin-based polymer such as ethylene homopolymer, propylene homopolymer, ethylene/butene copolymer, ethylene/hexene copolymer and ethylene/methacrylate copolymer, etc. may be used alone or in a laminate thereof, or a conventional porous nonwoven fabric, for example, a nonwoven fabric made of glass fiber, polyethyleneterephthalate fiber or the like with high melting point can be used, but are not limited thereto.

The electrolyte for the lithium-sulfur battery according to the present invention is a non-aqueous electrolyte containing a lithium salt and is composed of lithium salt and an electrolyte solution, and non-aqueous organic solvent, organic solid electrolyte and inorganic solid electrolytes etc. may be used as the electrolyte solution.

The lithium salt of the present invention is a substance which can be easily dissolved in a non-aqueous organic solvent, and for example, may include at least one selected from the group consisting of LiCl, LiBr, LiI, $LiClO_4$, $LiBF_4$, $LiB_{10}Cl_{10}$, $LiB(Ph)_4$, $LiPF_6$, $LiCF_3SO_3$, $LiCF_3CO_2$, $LiAsF_6$, $LiSbF_6$, $LiAlCl_4$, $LiSO_3CH_3$, $LiSO_3CF_3$, LiSCN, $LiC(CF_3SO_2)_3$, $LiN(CF_3SO_2)_2$, lithium chloroborane, lithium lower aliphatic carboxylate, lithium tetraphenyl borate, and lithium imide.

The concentration of the lithium salt may be 0.2 to 2 M, preferably 0.6 to 2 M, more preferably, 0.7 to 1.7 M depending on various factors such as the exact composition of the electrolyte mixture, the solubility of the salt, the conductivity of the dissolved salt, the charging and discharging conditions of the battery, the operating temperature and other factors known in the lithium battery field. If the concentration of the lithium salt is less than 0.2 M, the conductivity of the electrolyte may be lowered and thus the performance of the electrolyte may be deteriorated. If the concentration of the lithium salt exceeds 2 M, the viscosity of the electrolyte may increase and thus the mobility of the lithium ion ($Li^+$) may be reduced.

The non-aqueous organic solvent should dissolve the lithium salt well, and the non-aqueous organic solvent of the present invention may include, for example, aprotic organic solvents such as N-methyl-2-pyrrolidone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydroxy franc, 2-methyl tetrahydrofuran, dimethylsulfoxide, 1,3-dioxolane, 4-methyl-1,3-dioxen, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents can be used alone or in a mixed solvent form of two or more solvents thereof.

As the organic solid electrolyte, for example, polyethylene derivatives, polyethylene oxide derivatives, polypropylene oxide derivatives, phosphate ester polymers, poly agitation lysine, polyester sulfide, polyvinyl alcohol, polyvinylidene fluoride, and polymers including ionic dissociation groups and the like can be used.

As the inorganic solid electrolyte of the present invention, for example, nitrides, halides, sulfates and the like of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$ may be used.

Hereinafter, in order to explain the present invention in detail, the present invention will be described with reference to examples. However, the examples according to the present invention can be modified into various other forms, and the scope of the present invention should not be construed as being limited to the examples described below. The examples of the present invention are provided to more fully describe the present invention to those skilled in the art.

Example 1

(1) Preparation of PI/C Composite

Secondary particles of Denka black were prepared by introducing a spray drying process. Poly(pyromellitic dianhydride-co-4,4'-oxydianiline), amic acid solution 15.0±5 wt. % in NMP/aromatic hydrocarbons (80%/20% solvent was used as the solution of the polyimide precursor. After collecting 5 g of the solution, NMP was added to prepare a 1 wt. % solution of the polyimide precursor. 2.5 g of the prepared secondary particles of Denka black were added and then the mixture was sonicated for 1 hour, stirred for 1 hour and filtrated/dried (60° C., 12 h, vacuum) to obtain Denka black coated with poly(amic acid), i.e., PAA. During the heat treatment, grinding was performed for even imidization. Then, the stepwise thermal imidization was performed in a nitrogen atmosphere at 60° C. for 30 min→120° C. for 30 min→200° C. for 60 min→300° C. for 60 min→400° C. for 10 min to produce a PI-coated Denka black composite.

(2) Preparation of PI/C/S Composite

A PI/C/S composite with S:C:PI=7:3:0.33 was prepared using the PI-coated Denka black composite prepared in (1) above, and the electrodes were prepared at a ratio of PI/C/S composite: DB:CMC/SBR=90:3:5:5 and used a 2.7 mAh/$cm^2$ loading electrode. 100 μl DEGDME:DOL=6:4, 1M LiFSI, 1% $LiNO_3$ electrolyte solution was injected, and a lithium-sulfur battery of coin cell type 2032 was prepared using 150 μm of Li metal and PE separator.

Comparative Example 1

S/Denka black=7/3 composite was prepared, and an electrode with a composite:Denka black:CMC/SBR=90:5:5 was prepared and used a 2.5 mAh/$cm^2$ loading electrode. 100 μl DEGDME:DOL=6:4, 1M LiFSI, 1% $LiNO_3$ electrolyte solution was injected, and a lithium-sulfur battery of coin cell type 2032 was prepared using 150 μm of Li metal and PE separator.

Experimental Example 1

FIG. 1 shows the result of thereto gravimetric analysis (TGA) of the PI/C composite and the PI/C/S composite prepared in Example 1 in a nitrogen atmosphere. It was confirmed that 11 wt. % of PI was synthesized on Denka black and that the amount of carbon (C) was about 30 wt. % after removing the polyimide (PI) and sulfur (S) from the PI/C/S composite.

Experimental Example 2

The coin cell test was carried out under the condition of 0.3 C charging/0.5 C discharging after 2.5 cycles of discharging/charging at 0.1 C condition after 12 hours of REST. As can be seen from the experimental results shown in FIG. 2, it is confirmed that in the case of the lithium-sulfur battery of Comparative Example 1, the coulombic efficiency was rapidly lowered, but in the case of the lithium-sulfur battery of Example 1, the coulombic efficiency was improved.

The invention claimed is:

1. A polyimide-carbon-sulfur composite comprising porous carbon-based secondary particles formed by assembling and aggregating a plurality of carbon-based primary particles; a coating layer of polyimide coated on the inside and outside of the pores of the carbon-based secondary particles; and sulfur (S) supported in the pores of the carbon-based secondary particles.

2. The polyimide-carbon-sulfur composite according to claim 1, wherein the polyimide coating layer continuously or discontinuously forms a coating layer on the surface of the porous carbon-based secondary particles, or the polyimide coating layer allows the pores to be maintained and forms a porous coating layer.

3. The polyimide-carbon-sulfur composite according to claim 1, wherein the weight ratio of the polyimide to the carbon-based secondary particles is 5:95 to 20:80.

4. The polyimide-carbon-sulfur composite according to claim 1, wherein the carbon-based secondary particles are at least one selected from the group consisting of graphite series including natural graphite, artificial graphite, expanded graphite, graphene, graphene oxide, Super-P and Super-C; active carbon series; carbon black series including Denka black, Ketjen black, channel black, furnace black, thermal black, contact black, lamp black, acetylene black; carbon nanostructure including carbon fiber series, carbon nanotube (CNT), and fullerene; and combinations thereof.

5. The polyimide-carbon-sulfur composite according to claim 1, wherein the carbon-based secondary particles have an average particle size of 1 to 50 μm.

6. The polyimide-carbon-sulfur composite according to claim 1, wherein the carbon-based secondary particles have a pore volume of 0.2 to 4.0 cm$^3$/g.

7. The polyimide-carbon-sulfur composite according to claim 1, wherein the carbon-based secondary particles have a specific surface area of 100 to 2000 m$^2$/g.

8. The polyimide-carbon-sulfur composite according to claim 1, wherein sulfur is at least one selected from the group consisting of elemental sulfur ($S_8$), solid $Li_2S_n$ (n≥1), catholytes in which solid $Li_2S_n$ (n≥1) is dissolved, organosulfur compounds, and carbon-sulfur polymers [$(C_2S_x)_n$, where x=2.5 to 50, and n≥2].

9. The polyimide-carbon-sulfur composite according to claim 1, wherein the content of sulfur is 30 to 90% by weight based on the total weight of the composite.

10. A preparation method of a polyimide-carbon-sulfur composite, comprising:
 (i) assembling and aggregating a plurality of carbon-based primary particles under conditions effective to provide carbon-based secondary particles;
 (ii) mixing the carbon-based secondary particles with a solution of a polyimide precursor to provide a first solution;
 (iii) converting the first solution under effective reaction conditions to provide a polyimide-carbon composite; and
 (iv) complexing sulfur with the polyimide-carbon composite to provide a polyimide-carbon-sulfur composite,
 wherein a coating layer of polyimide is present on the inside and outside of the pores of the carbon-based secondary particles, and
 wherein the sulfur is supported in the pores of the carbon-based secondary particles.

11. The preparation method of the polyimide-carbon-sulfur composite according to claim 10, wherein the carbon-based secondary particles in (i) are prepared by spray-drying a solution containing the carbon-based primary particles.

12. The preparation method of the polyimide-carbon-sulfur composite according to claim 10, wherein the polyimide precursor in (ii) is a polyamic acid (PAA).

13. The preparation method of the polyimide-carbon-sulfur composite according to claim 10, wherein the first solution is converted to a polyimide-carbon composite in (iii) by a heat treatment comprising raising the temperature stepwise within a range of 60 to 400° C.

14. A lithium-sulfur battery comprising a positive electrode; a negative electrode; a separator interposed therebetween and an electrolyte, wherein the positive electrode comprises the polyimide-carbon-sulfur composite according to claim 1.

* * * * *